United States Patent [19]

Katzman et al.

[11] 4,050,875
[45] Sept. 27, 1977

[54] ARTS AND CRAFTS MOLDING DEVICE

[75] Inventors: Allison W. Katzman; Albert G. Keller, both of Chicago, Ill.

[73] Assignee: Marvin Glass & Associates, Chicago, Ill.

[21] Appl. No.: 637,729

[22] Filed: Dec. 4, 1975

[51] Int. Cl.$^2$ .............................................. B29C 5/04
[52] U.S. Cl. .................................. 425/429; 425/435; 264/310
[58] Field of Search ............... 425/429, 430, 426, 434, 425/435, 460, 47, 146, 156, 137; 164/115, 116, 117, 118, 119; 249/163, 168, 173; 259/81 R, 18, 89, 90; 74/801, 791, 798; 264/310

[56] References Cited

U.S. PATENT DOCUMENTS

| 498,271 | 5/1930 | Hoobler | 188/69 |
| 546,730 | 8/1895 | Daniels | 188/69 |
| 1,784,686 | 12/1930 | Fauerbach | 264/310 |
| 1,983,757 | 12/1934 | Hick | 249/66 A |
| 2,290,396 | 7/1942 | Webster | 249/66 |
| 2,716,555 | 8/1955 | Rowe | 279/1 K |
| 2,967,329 | 1/1961 | Friedland et al. | 264/310 |
| 3,072,965 | 1/1963 | Miller | 425/430 |
| 3,217,078 | 11/1965 | Kleiber | 264/310 |
| 3,337,662 | 8/1967 | Spencer | 425/429 |
| 3,347,971 | 10/1967 | Mankowich et al. | 264/310 |
| 3,350,745 | 11/1967 | Schott et al. | 425/429 |
| 3,788,792 | 1/1974 | Suzuki | 425/429 |
| 3,872,951 | 3/1975 | Hastings | 279/1 K |
| 3,880,557 | 4/1975 | Nelson | 425/812 |

Primary Examiner—Robert L. Spicer, Jr.
Attorney, Agent, or Firm—Mason, Kolehmainen, Rathburn & Wyss

[57] ABSTRACT

A device and method for use in the art or craft of molding hollow artistic objects from thermoplastic molding material, such as wax. The molding device includes a frame with a vertical stationary, circular gear rack secured thereto. A crank driven shaft is journaled through the frame in a position concentric with the rack. A yoke-like mold carrier is secured to the end of the shaft for rotation therewith. A mold holder is, in turn, mounted on the mold carrier for rotation about an axis generally perpendicular to the crank shaft axis between the yoke arms of the mold carrier. The mold holder has a shaft projecting through one of the yoke arms of the mold carrier and is secured to and driven with a disc gear, which is enmeshed with the gear rack. As the crank is turned to rotate the mold carrier, the disc gear rides on the gear rack and rotates the mold holder. In operation, a mold in the form of a pair of mating mold halves providing a mold cavity is supplied with molten thermoplastic material, assembled, and mounted on the mold holder. Turning of the crank causes the mold to be rotated on the two generally perpendicular axes and generally evenly distributes the thermoplastic material on the interior of the mold cavity surface as it cools and sets.

8 Claims, 8 Drawing Figures

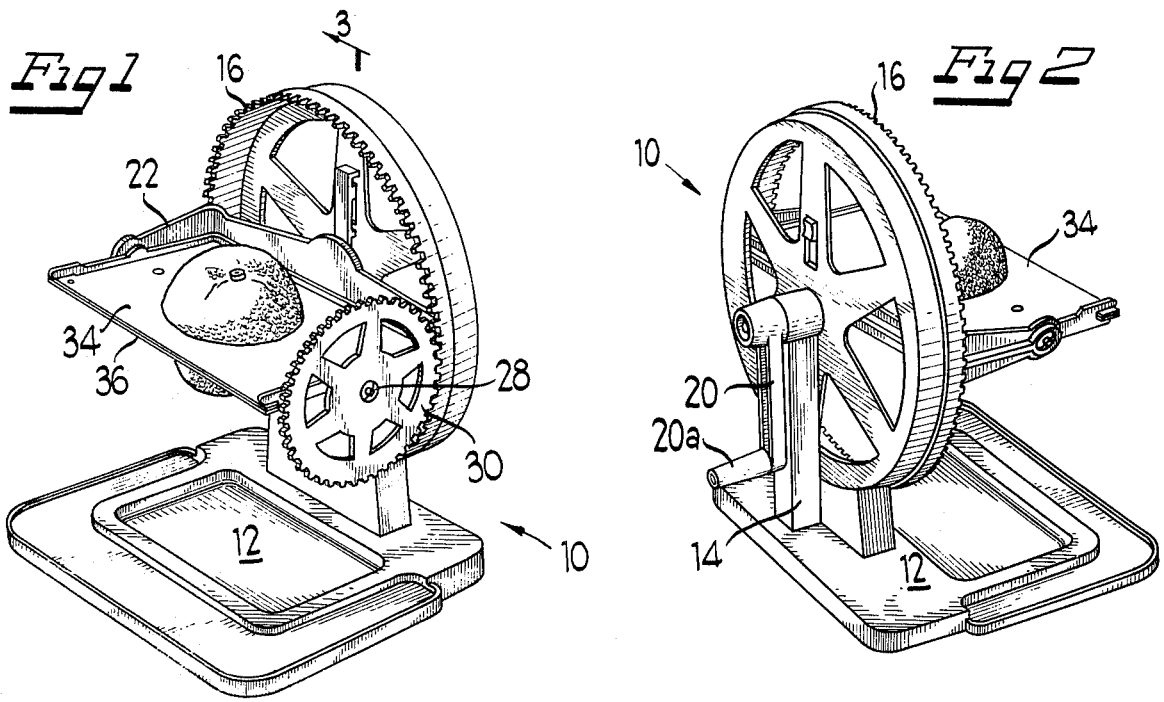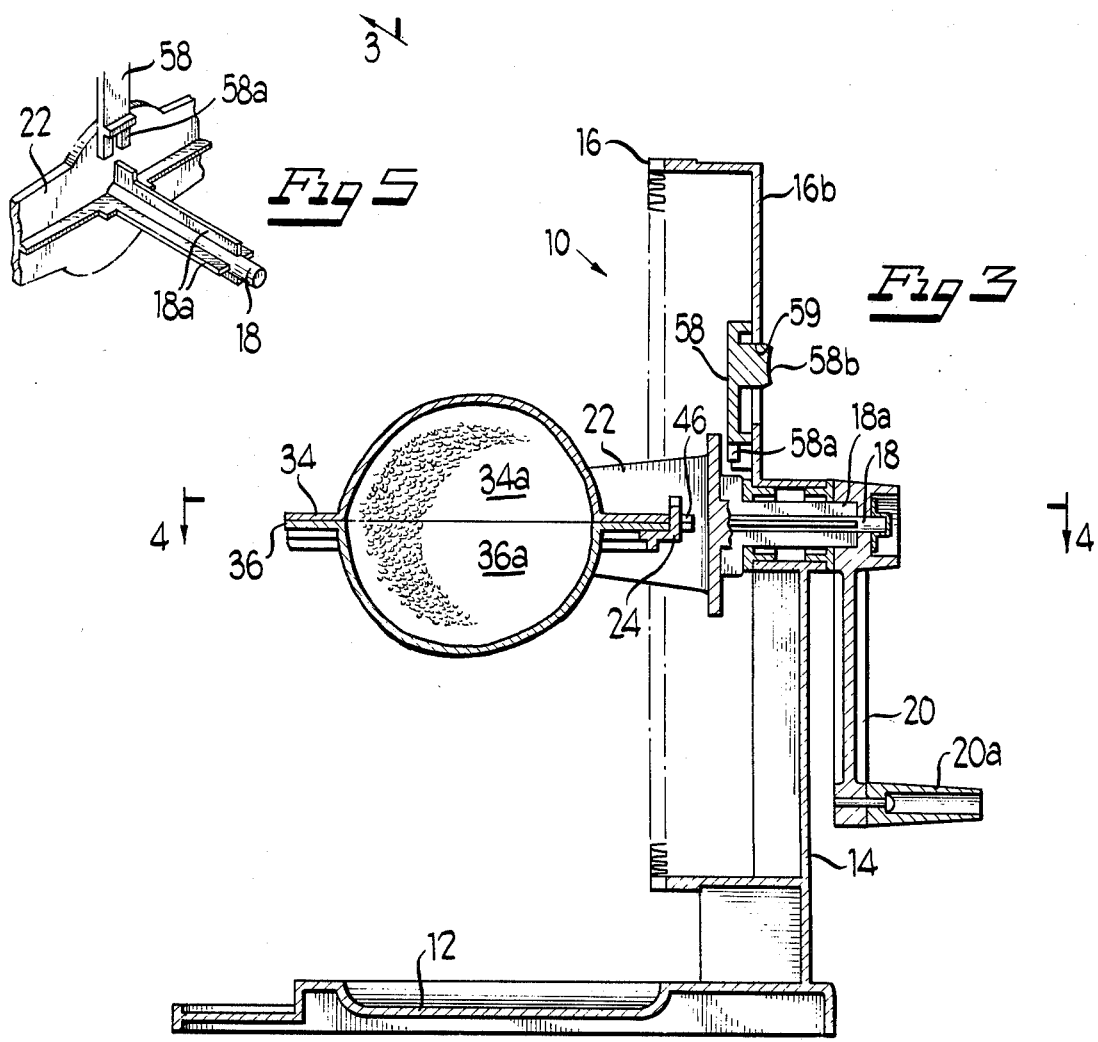

ARTS AND CRAFTS MOLDING DEVICE

BACKGROUND OF THE INVENTION

1. Field of the Invention

This invention relates to an arts and crafts device and a method in which molded objects, in the form of wax fruit or the like, are produced by rotational molding. More particularly, the invention relates to a simplified device and method which can be used in the home by a person unskilled in the art to produce such objects for use as decorations, or the like.

2. Brief Description of the Prior Art

Arts and crafts devices have, in the past, been well received by the public. Users of such devices are enabled or assisted by the device in making a variety of arts and crafts products. Looms, clay molding systems, and beading devices have had long and continued popularity. Wax molding has also enjoyed popularity although prior systems have suffered from being cumbersome or difficult to use or they produce a large percentage of imperfect objects.

SUMMARY OF THE INVENTION

A new arts and crafts device for making hollow molded replicas of objects such as pieces of fruit or the like from a molten thermoplastic material, such as wax. The device has a frame with a mold receiver mounted on the frame for rotation on two separate rotational axes to provide universal tumble molding. Mold halves containing molten thermoplastic material for forming the object are mounted in the mold receiver and the mold receiver is rotated about its two axes. The thermoplastic material begins to become less liquid and tends to partially solidify on the mold walls producing a hollow mass of the material within the mold. The mold then is cooled or permitted to cool at ambient temperature until the molded object is solid and the object is then removed from the mold.

A lock system can be used to lock the mold against movement during the mold loading operation. Also, during molding and cooling operations it is sometimes desirable to equalize pressure within the mold with ambient pressure so a vent system is provided which prevents leaking of the thermoplastic material from the mold while it is in a molten state but permits communication between the exterior of the mold and the interior of the object being molded as the thermoplastic material solidifies.

BRIEF DESCRIPTION OF THE DRAWINGS

FIGS. 1 and 2 are front and rear, or opposed, perspective views of an embodiment of the arts and crafts molding device provided by the present invention;

FIG. 3 is a vertical section, on an enlarged scale, through the device taken along line 3—3 of FIG. 1;

FIG. 5 is a fragmented perspective view of the drive shaft and a portion of a locking system for locking the drive shaft;

DETAILED DESCRIPTION OF THE PREFERRED EMBODIMENT

Figure 4:
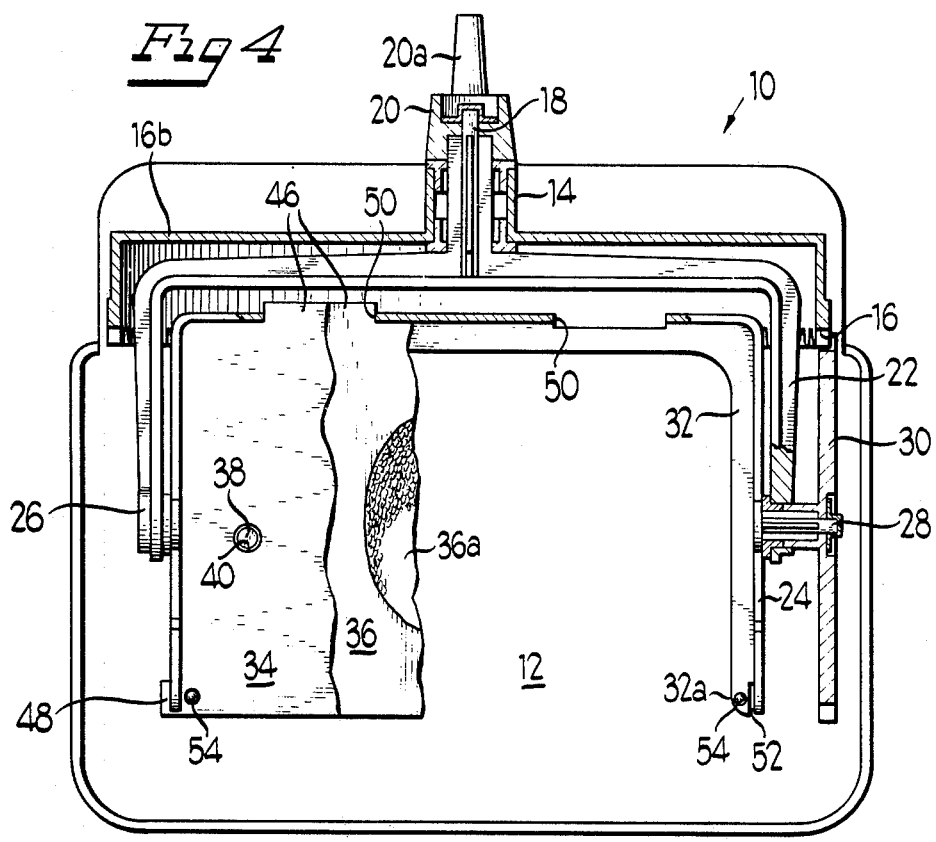
FIG. 4 is a sectional view taken generally along line 4—4 of FIG. 3 with portions of the mold elements cut away.

Referring first to FIGS. 1 through 4, the illustrated device includes a frame 10 having a base 12 and an upstanding arm 14 with a vertical, stationary circular gear rack 16 secured to and supported by arm 14 and base 12. A shaft 18 (FIGS. 3 and 5) having longitudinal ribs 18a is mounted through arm 14 and concentrically through the stationary rack 16 for rotation relative thereto. A crank 20, having a handle 20a, is secured to one end of the shaft 18 engaging the ribs 18a for rotating the shaft 18. The other end of shaft 18 is secured to a mold carrier in the form of a yoke 22 (FIGS. 1-4) so that when crank 20 is rotated to rotate shaft 18, yoke 22 rotates therewith in a vertical circular path.

Figure 7:
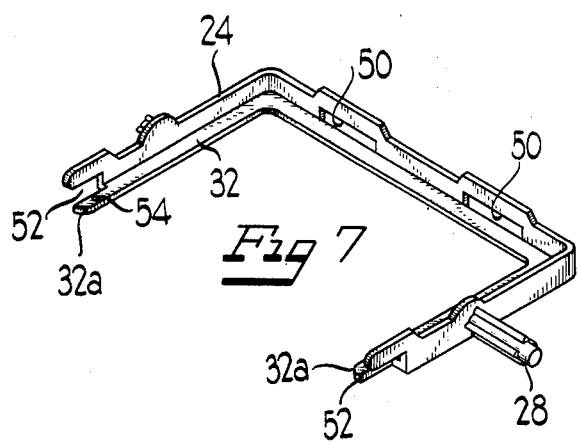
FIG. 7 is a perspective view of the mold receiver used in the device.

Referring especially to FIGS. 4 and 7, yoke 22 has generally parallel opposing arms which support a U-frame 24 which, in turn, is mounted for rotation relative to yoke 22 by a trunion 26 and suitable bearing means for a shaft 28 secured to the U-frame 24. The shaft 28 extends through an arm of yoke 22 and is secured at its other end to a disc gear 30 (FIGS. 1 and 4) for rotation therewith. Disc gear 30 is enmeshed with the teeth of the stationary rack 16.

It will be seen (FIGS. 1 through 4) that as hand crank 20 is operated, yoke 22 rotates on the axis of shaft 18. Disc gear 30, riding on rack 6, causes U-frame 24 to rotate relative to yoke 22 on an axis approximately perpendicular to the axis of shaft 18.

As best seen in FIGS. 4 and 7, U-frame 24 has an inwardly projecting peripheral ledge or shelf 32 for supporting a platen-type mold. The platen mold (FIGS. 3 and 6) comprises a top mold half 34 and a bottom mold half 36, each having mold cavities, as at 34a and 36a, which mate to form an enclosed mold. Pins 38 on mold half 36 are receivable in bores 40 in mold half 34 to properly align and locate the mold halves when assembled face to face with each other.

Figure 6:
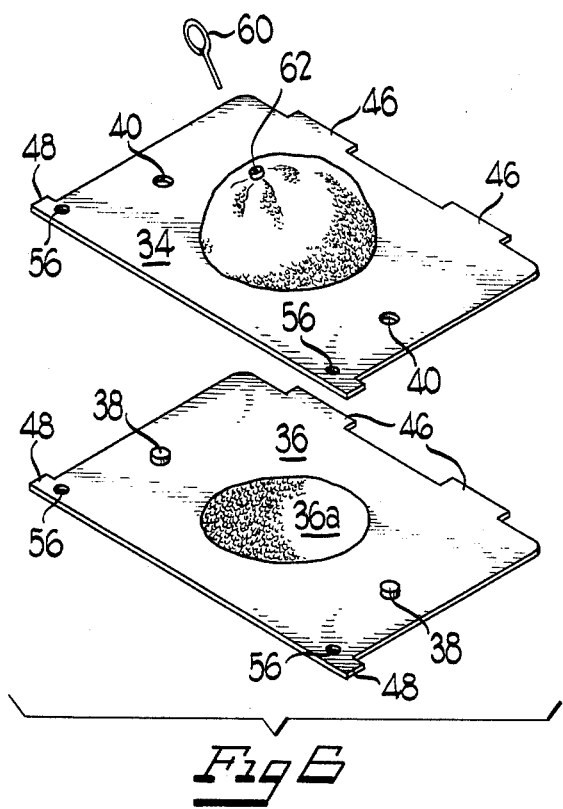
FIG. 6 is an exploded perspective view of a mold useful in the device of FIGS. 1 and 2.

The mold halves 34 and 36 have tongue portions 46 and laterally projecting ear portions 48 (FIGS. 3, 4 and 6). The U-frame 24 has a pair of tongue receivers 50 (FIGS. 4 and 7) in the rear portion thereof for receiving the tongues 46. Frame 24 also includes ear receivers 52 for receiving the ears 48. It will be seen that when the mold halves 34 and 36 are properly mated to form a complete mold cavity and are slid into the U-frame 24 from its open side, the tongue portions 46 will be received by the tongue receivers 50 and the ear portions 48 will be received by the ear receivers 52.

In addition, a detent means is provided to help retain the mold halves in U-frame 24 during rotation of the U-frame. The detent means includes a pair of lugs 54 on resilient forward extension 32a of the shelf 32. Registering bores 56 are provided in the mold halves 34 and 36 so that when the mold halves are joined and slid into U-frame 24 in proper position, the lugs 54 snap engage bores 56 and assure that the mold halves will be retained in proper position during rotation of yoke 22 and U-frame 24.

A locking device is provided for locking shaft 18, and, therefore, crank 20, yoke 22 and U-frame 24 against rotation from a mold loading position with one mold cavity, e.g., 36a, facing upright while wax or other thermoplastic material is being poured into the cavity. Accordingly, a lock member 58 (FIGS. 3 and 5) is mounted for vertical sliding movement in an opening 59 in the rear support wall 16b of gear rack 16. Lock member 58 has a downwardly projecting forked end 58a and a manually accessible button portion 58b which can be manipulated to slide lock member 58 downward from its position shown in FIGS. 3 and 5 so that the double pronged forked end 58a engages and receives a radially projecting flange 18b on shaft 18 to hold shaft 18 against rotation.

As best seen in FIGS. 4, 6 and 7, in use, the bottom mold half 36 is placed in proper position on shelf 32 and filled with molten wax, e.g., to within about one-half inch from the top of the mold half cavity. The top mold half 34 then is likewise positioned in place in U-frame 24 with the pins 38 registering in bores 40. Alternatively, the one mold half can be supplied with molten wax and assembled with the other mold half and both mold halves simultaneously can be located within U-frame 24. The interior of each mold half cavity should be coated with a suitable mold release material such as a liquid detergent prior to filling. Color pigments can be added as needed or desired in order to simulate the color characteristics of the object being molded.

An air pressure pin 60 (FIG. 6) is provided for insertion into a bore or port 62 in one mold half to retain the liquid thermoplastic material within the mold during rotation of the mold and to vent the mold interior by removing the pin during cooling and solidification of the thermoplastic material. For example, when using wax as a molding material, preferably the air pressure pin 60 is removed after about 1 minute, and cranking is then continued for about 4 minutes. The air pressure pin 60 is then replaced in bore 62 and the mold is removed from U-frame 24 and cooled under cold water or in a refrigerator. The air pressure pin 60 should be removed again sometime during the cooling operation. Ambient temperatures are sufficient to cool and mold, although a longer period of time will be required. After cooling, the object is removed from the mold.

Figure 8:
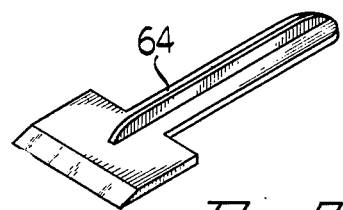
FIG. 8 is a perspective view of a trimming knife which is useful in perfecting objects produced by the device in FIGS. 1 and 2.

A knife-like trimming device 64 (FIG. 8) is provided for the purpose of trimming flash or the like from the molded object, or to further carve the molded form.

The device and method of the present invention has advantages which will be evident to the arts and crafts enthusiast. Both the device and the method are simple to use and capable of use by the ordinary hobbyist. The articles produced are excellent replicas after minor operations of removing possible flash and hand polishing if desired. Other modifications of the method and even of the device will be apparent to those skilled in arts and crafts.

We claim:

1. An arts and crafts device for molding hollow objects or the like from molten thermoplastic material to provide a hollow molded end product, which device comprises a frame having a base portion and a vertical carriage support, a carriage mounted on said carriage support for rotation about a first axis, a crank having a drive shaft mounted on said frame for rotation relative thereto and secured to said carriage for rotating said carriage, said carriage being in the form of a yoke having two opposing arms, a mold receiver including two generally planar sheets for holding a split mold, each half of said mold being secured to one of said sheets, means including a second frame and a second shaft mounting said mold receiver to and between said yoke arms for rotation relative thereto about a second axis generally perpendicular to said first axis, a crown gear on said frame concentric with said first axis, and a second gear mounted on said second shaft and enmeshed with said crown gear for tracking said crown gear while said carriage is rotated by said crank, thereby also rotating said mold on said second, perpendicular axis.

2. The device of claim 1 including air pressure release port means through the mold cavity of one of said mold halves for releasing air pressure from the mold cavity, and removable plug means inserted into said port means.

3. The device of claim 1 including aligning means on said second frame and said sheets of the mold receiver for releasably holding and aligning the mold halves including detent means in the form of posts and bores in said sheets retaining the mold halves against one another during rotation thereof.

4. The device of claim 1 including manually operable releasable lock means retaining said yoke in a stop and load position with one of said mold halves mounted in said receiver with its cavity portion facing upward for insertion of molten wax thereinto.

5. The device of claim 4 wherein said lock means comprises at least one radial projection on said drive shaft and a slidably mounted lock member on said frame engageable with said projection.

6. An arts and crafts device for molding hollow objects from molten wax to provide a hollow molded end product, comprising:
a frame having a generally rectangular base portion for supporting the frame on a suitable support surface and a single, vertically extending carriage support arm having a journal formed at its upper free end;
a carriage in the form of a yoke having two opposing arms mounted in said journal for rotation about a generally horizontal, first axis;
a manually operable crank connected to said carriage by a generally horizontal drive shaft mounted within the journal;
a second frame mounted between the ends of said yoke arms for rotation relative thereto about a second axis, generally perpendicular to said first axis;
a crown gear mounted on said vertical carriage support concentric with said first axis;
a second gear mounted on said second frame in engagement with said crown gear for rotation of said second frame about said second axis as the carriage is rotated about said first axis; and
a mold including two generally planar members, each of said planar members including a portion thereof defining half of said mold, said planar members each including aligning means cooperating with said second frame to align said mold halves relative to one another and detent means for maintaining said mold halves in engagement with one another during the rotation thereof.

7. The device of claim 6 including manually operable release lock means for retaining the carriage in a load position whereat said planar members are positioned in a generally horizontal plane to facilitate removal of said upper member for filling said lower mold with molten thermoplastic material.

8. The device of claim 7 wherein said manually operable releasable lock means includes a plurality of radial protrusions on said shaft and a slidably mounted, manually operable lock member on said frame for engagement with said protrusion to lock the carriage in said load position.

* * * * *